A. MANTEAU.
SHIELD FOR TRUCKS.
APPLICATION FILED JAN. 22, 1913.
1,072,965. Patented Sept. 9, 1913.
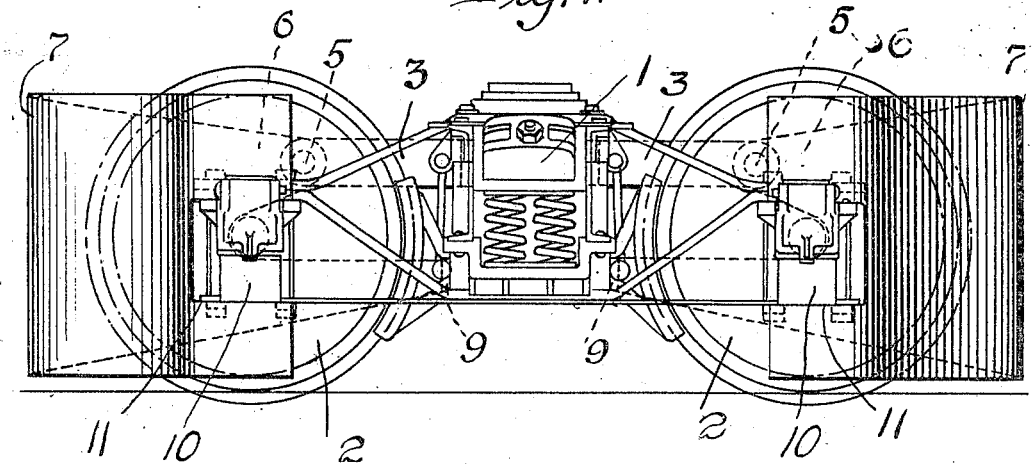
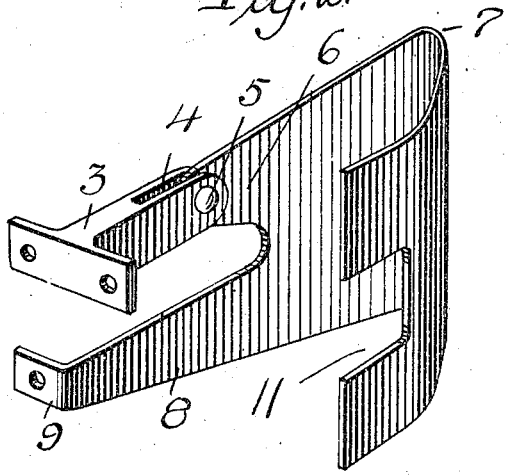
WITNESSES
INVENTOR
A. Manteau.
ATTORNEYS

UNITED STATES PATENT OFFICE.

AMOS MANTEAU, OF DILLONVALE, OHIO.

SHIELD FOR TRUCKS.

1,072,965.  Specification of Letters Patent.  Patented Sept. 9, 1913.

Application filed January 22, 1913. Serial No. 743,463.

*To all whom it may concern:*

Be it known that I, AMOS MANTEAU, a citizen of the United States of America, residing at Dillonvale, in the county of Jefferson and State of Ohio, have invented certain new and useful Improvements in Shields for Trucks, of which the following is a specification, reference being had therein to the accompanying drawing.

This invention relates to shields for trucks, and the primary object of my invention is to furnish the trucks of railway rolling stock, vehicles or other movable bodies, with positive and reliable means, as hereinafter set forth, for shielding the wheels of the truck, whereby persons and large objects will be deflected and therefore cannot be run over or injured by the trucks.

Another object of this invention is to furnish a truck with novel wheel guards that are constructed and arranged to adjust themselves to the trucks irrespective of vibrations set up between the trucks and the bolster or permanent part of a car.

A further object of this invention is to provide simple, durable and inexpensive wheel guards for railway rolling stock that can be easily and quickly installed in connection with various types of trucks.

With the above and other objects in view the invention resides in the novel construction, combination and arrangement of parts to be hereinafter specifically described and then claimed.

Reference will now be had to the drawing, wherein:—

Figure 1 is a side elevation of a truck provided with the shields, and Fig. 2 is a perspective view of a detached shield.

Further describing my invention in detail with reference to the accompanying drawing, wherein like numerals denote corresponding parts throughout:—1 denotes a bolster of a truck which has wheels 2 and is supported by said bolster; at the outer end thereof are brackets 3 that extend at right angles to the bolster and in parallelism with the wheels 2, at the inner sides thereof. The brackets 3 are bifurcated, as at 4 and pivotally connected to said brackets by pins 5 are the short extensions 6 of the long inner arms of the shields 7 that are U-shaped in plan. The shields 7 have long extensions 8 at the inner sides of the wheels 2 and these long extensions are connected to the truck, as at 9. The outer arms of the shields extend to the journal boxes 10 of the truck and are cut away, as at 11 to straddle said boxes whereby the outer sides of the shields will be supported by the boxes.

With the shields supported in the manner illustrated in Fig. 1, said shields serve as guards for the wheels 2 of the truck and extend in proximity to the rails upon which the truck travels; consequently objects upon the track are deflected and prevented from being run over or injured by the wheels of the truck.

The manner of rigging the shields insures a position whereby they will always be maintained in position irrespective of the vibrations between the movable parts of the truck.

The shields are made of light and durable metal and while in the drawing there is illustrated a preferred embodiment of the invention, it is to be understood that the structural elements are susceptible to such variations and modifications as fall within the scope of the appended claim.

What I claim is:—

A truck shield comprising a bracket adapted to be secured to one end of the truck and having a bifurcated end, a shield member substantially U-shaped in plan and having one of its arms of greater length than the other, said elongated arm being cut away to provide a short and an elongated extension, and means for pivotally connecting said short extension to the bifurcated end of said bracket, said elongated extension being provided with a flange and adapted to be secured to the truck below said bracket and the short arm of said shield member being bifurcated to provide a clearance for the straddling of a journal box by said arm.

In testimony whereof I affix my signature in the presence of two witnesses.

AMOS MANTEAU.

Witnesses:
AIMÉ MANTEAU,
RALPH J. FORD.